US012400163B1

(12) United States Patent
Hu et al.

(10) Patent No.: US 12,400,163 B1
(45) Date of Patent: Aug. 26, 2025

(54) SEMI-MATRIX UNIT AND CHARGING PILE SCHEDULING SYSTEM INCLUDING THE SAME, AND CHARGING PILE SCHEDULING METHOD

(71) Applicant: Sichuan Injet New Energy Co., Ltd., Deyang (CN)

(72) Inventors: Dengjun Hu, Deyang (CN); Kun Yang, Deyang (CN); Qiang Zhao, Deyang (CN); Guanqi Wang, Deyang (CN)

(73) Assignee: Sichuan Injet New Energy Co., Ltd., Deyang (CN)

( * ) Notice: Subject to any disclaimer, the term of this patent is extended or adjusted under 35 U.S.C. 154(b) by 0 days.

(21) Appl. No.: 19/200,068

(22) Filed: May 6, 2025

(51) Int. Cl.
| | |
|---|---|
| *H02J 7/00* | (2006.01) |
| *B60L 53/62* | (2019.01) |
| *B60L 53/67* | (2019.01) |
| *G06Q 10/0631* | (2023.01) |
| *G06Q 50/06* | (2012.01) |
| *H02J 7/14* | (2006.01) |

(52) U.S. Cl.
CPC ........ *G06Q 10/06315* (2013.01); *B60L 53/62* (2019.02); *B60L 53/67* (2019.02); *G06Q 50/06* (2013.01); *H02J 7/0013* (2013.01)

(58) Field of Classification Search
CPC .......... B60L 53/62; B60L 53/67; G06Q 50/06
USPC ....................................................... 320/134
See application file for complete search history.

(56) References Cited

U.S. PATENT DOCUMENTS

| | | | | |
|---|---|---|---|---|
| 7,792,135 | B2 * | 9/2010 | Yu ........................... | H04J 13/10 370/441 |
| 11,332,031 | B2 * | 5/2022 | . .............................. | B60L 58/10 |
| 12,046,934 | B2 * | 7/2024 | Liu ....................... | H02J 7/0042 |
| 2015/0028675 | A1 * | 1/2015 | Scheurlen ................. | H02J 3/28 307/45 |
| 2016/0185246 | A1 * | 6/2016 | Paul ........................ | B60L 53/65 320/106 |
| 2021/0291690 | A1 * | 9/2021 | Lu ............................ | B60L 53/67 |

(Continued)

FOREIGN PATENT DOCUMENTS

| | | |
|---|---|---|
| CN | 110103746 A | 8/2019 |
| CN | 113580985 A | 11/2021 |

(Continued)

*Primary Examiner* — Alexis B Pacheco
(74) *Attorney, Agent, or Firm* — Birchwood IP

(57) ABSTRACT

Disclosed are a semi-matrix unit and a charging pile scheduling system including the same, and a charging pile scheduling method, which relate to the technical field related to electric vehicle charging scheduling. The present application aims to solve excessive use of switching devices, poor expansibility and overly complex scheduling mechanisms in the current charging pile. According to the present application, few switching devices are used in semi-matrix units, any charging module is scheduled to any charging node, semi-matrix units are connected in a branching structure, a ring structure and a network structure by a modular structure of the charging pile scheduling system, the semi-matrix units serve as charging semi-matrix units or power supplement semi-matrix units, and the steps of the charging pile scheduling method are simple. The present application achieves the technical effects of reducing the use of switching devices, and having stronger expansibility and a simple scheduling mechanism.

1 Claim, 13 Drawing Sheets

(56) References Cited

U.S. PATENT DOCUMENTS

| | | | |
|---|---|---|---|
| 2021/0291694 A1* | 9/2021 | Shaaban | B60L 53/67 |
| 2022/0250486 A1* | 8/2022 | McCalmont | H02J 7/35 |
| 2023/0249567 A1* | 8/2023 | Cohen | B60L 3/0023 |
| | | | 320/109 |
| 2024/0119281 A1* | 4/2024 | Khalid | H02J 3/28 |
| 2024/0227604 A1* | 7/2024 | Li | H02M 3/33571 |
| 2025/0079836 A1* | 3/2025 | Elkhomri | H02J 3/32 |
| 2025/0083550 A1* | 3/2025 | Elkhomri | B60L 53/63 |

FOREIGN PATENT DOCUMENTS

| | | |
|---|---|---|
| CN | 116373632 A | 7/2023 |
| CN | 117698486 A | 3/2024 |
| CN | 117841742 A | 4/2024 |
| CN | 118662814 B | 9/2024 |

* cited by examiner

| No. | Number of charging modules requested by charging node | | | | | Switch state | | | | | | | | | | Load switch | | | |
|---|---|---|---|---|---|---|---|---|---|---|---|---|---|---|---|---|---|---|---|
| | | | | | | Charging module | | | | Scheduling switch | | | | | | K7 | K8 | K9 | K10 |
| | | | | | | | | | | | | | | | | Expansion switch | | | |
| | G1 | G2 | G3 | G4 | Total | M1 | M2 | M3 | M4 | K1 | K2 | K3 | K4 | K5 | K6 | K11 | K12 | K13 | K14 |
| 1 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 1 | 1 | 0 | 0 | 0 | 1 | 0 | 0 | 0 | 0 | 0 | 0 | 0 | 0 | 0 | 1 |
| 3 | 0 | 0 | 0 | 2 | 2 | 0 | 0 | 1 | 1 | 0 | 0 | 1 | 0 | 0 | 0 | 0 | 0 | 0 | 1 |
| 4 | 0 | 0 | 0 | 3 | 3 | 0 | 1 | 1 | 1 | 0 | 0 | 1 | 0 | 1 | 0 | 0 | 0 | 0 | 1 |
| 5 | 0 | 0 | 0 | 4 | 4 | 1 | 1 | 1 | 1 | 0 | 0 | 1 | 0 | 1 | 1 | 0 | 0 | 0 | 1 |
| 6 | 0 | 0 | 1 | 0 | 1 | 0 | 0 | 1 | 0 | 0 | 0 | 0 | 0 | 0 | 0 | 0 | 0 | 1 | 0 |
| 7 | 0 | 0 | 1 | 1 | 2 | 0 | 0 | 1 | 1 | 0 | 0 | 0 | 0 | 0 | 0 | 0 | 0 | 1 | 1 |
| 8 | 0 | 0 | 1 | 2 | 3 | 0 | 1 | 1 | 1 | 0 | 0 | 0 | 0 | 1 | 0 | 0 | 0 | 1 | 1 |
| 9 | 0 | 0 | 1 | 3 | 4 | 1 | 1 | 1 | 1 | 0 | 0 | 0 | 0 | 1 | 1 | 0 | 0 | 1 | 1 |
| 10 | 0 | 0 | 2 | 0 | 2 | 0 | 1 | 1 | 0 | 0 | 1 | 0 | 0 | 0 | 0 | 0 | 0 | 1 | 0 |
| 11 | 0 | 0 | 2 | 1 | 3 | 0 | 1 | 1 | 1 | 0 | 1 | 0 | 0 | 0 | 0 | 0 | 0 | 1 | 1 |
| 12 | 0 | 0 | 2 | 2 | 4 | 1 | 1 | 1 | 1 | 0 | 0 | 0 | 1 | 1 | 0 | 0 | 0 | 1 | 1 |
| 13 | 0 | 0 | 3 | 0 | 3 | 0 | 1 | 1 | 1 | 0 | 1 | 1 | 0 | 0 | 0 | 0 | 0 | 1 | 0 |
| 14 | 0 | 0 | 3 | 1 | 4 | 1 | 1 | 1 | 1 | 0 | 1 | 0 | 1 | 0 | 0 | 0 | 0 | 1 | 1 |
| 15 | 0 | 0 | 4 | 0 | 4 | 1 | 1 | 1 | 1 | 0 | 1 | 1 | 1 | 0 | 0 | 0 | 0 | 1 | 0 |
| 16 | 0 | 1 | 0 | 0 | 1 | 0 | 1 | 0 | 0 | 0 | 0 | 0 | 0 | 0 | 0 | 0 | 1 | 0 | 0 |
| 17 | 0 | 1 | 0 | 1 | 2 | 0 | 1 | 0 | 1 | 0 | 0 | 0 | 0 | 0 | 0 | 0 | 1 | 0 | 1 |
| 18 | 0 | 1 | 0 | 2 | 3 | 0 | 1 | 1 | 1 | 0 | 0 | 1 | 0 | 0 | 0 | 0 | 1 | 0 | 1 |
| 19 | 0 | 1 | 0 | 3 | 4 | 1 | 1 | 1 | 1 | 0 | 0 | 1 | 0 | 1 | 0 | 0 | 1 | 0 | 1 |
| 20 | 0 | 1 | 1 | 0 | 2 | 0 | 1 | 1 | 0 | 0 | 0 | 0 | 0 | 0 | 0 | 0 | 1 | 1 | 0 |
| 21 | 0 | 1 | 1 | 1 | 3 | 0 | 1 | 1 | 1 | 0 | 0 | 0 | 0 | 0 | 0 | 0 | 1 | 1 | 1 |
| 22 | 0 | 1 | 1 | 2 | 4 | 1 | 1 | 1 | 1 | 0 | 0 | 0 | 0 | 1 | 0 | 0 | 1 | 1 | 1 |
| 23 | 0 | 1 | 2 | 0 | 3 | 1 | 1 | 1 | 0 | 0 | 0 | 1 | 0 | 0 | 0 | 0 | 1 | 1 | 0 |
| 24 | 0 | 1 | 2 | 1 | 4 | 1 | 1 | 1 | 1 | 0 | 0 | 0 | 1 | 0 | 0 | 0 | 1 | 1 | 1 |
| 25 | 0 | 1 | 3 | 0 | 4 | 1 | 1 | 1 | 0 | 0 | 1 | 1 | 0 | 0 | 0 | 0 | 1 | 1 | 0 |
| 26 | 0 | 2 | 0 | 0 | 2 | 1 | 1 | 0 | 0 | 1 | 0 | 0 | 0 | 0 | 0 | 0 | 1 | 0 | 0 |
| 27 | 0 | 2 | 0 | 1 | 3 | 1 | 1 | 0 | 1 | 1 | 0 | 0 | 0 | 0 | 0 | 0 | 1 | 0 | 1 |
| 28 | 0 | 2 | 0 | 2 | 4 | 1 | 1 | 1 | 1 | 1 | 0 | 0 | 0 | 1 | 0 | 0 | 1 | 0 | 1 |
| 29 | 0 | 2 | 1 | 0 | 3 | 1 | 1 | 1 | 0 | 1 | 0 | 0 | 0 | 0 | 0 | 0 | 1 | 1 | 0 |
| 30 | 0 | 2 | 1 | 1 | 4 | 1 | 1 | 1 | 1 | 1 | 0 | 0 | 0 | 0 | 0 | 0 | 1 | 1 | 1 |
| 31 | 0 | 2 | 2 | 0 | 4 | 1 | 1 | 1 | 1 | 1 | 0 | 1 | 0 | 0 | 0 | 0 | 1 | 1 | 0 |
| 32 | 0 | 3 | 0 | 0 | 3 | 1 | 1 | 1 | 0 | 1 | 1 | 0 | 0 | 0 | 0 | 0 | 1 | 0 | 0 |
| 33 | 0 | 3 | 0 | 1 | 4 | 1 | 1 | 1 | 1 | 1 | 1 | 0 | 0 | 0 | 0 | 0 | 1 | 0 | 1 |
| 34 | 0 | 3 | 1 | 0 | 4 | 1 | 1 | 1 | 1 | 1 | 1 | 0 | 0 | 0 | 0 | 0 | 1 | 1 | 0 |
| 35 | 0 | 4 | 0 | 0 | 4 | 1 | 1 | 1 | 1 | 1 | 1 | 0 | 1 | 0 | 0 | 0 | 1 | 0 | 0 |
| 36 | 1 | 0 | 0 | 0 | 1 | 1 | 0 | 0 | 0 | 0 | 0 | 0 | 0 | 0 | 0 | 1 | 0 | 0 | 0 |
| 37 | 1 | 0 | 0 | 1 | 2 | 1 | 0 | 0 | 1 | 0 | 0 | 0 | 0 | 0 | 0 | 1 | 0 | 0 | 1 |
| 38 | 1 | 0 | 0 | 2 | 3 | 1 | 0 | 1 | 1 | 0 | 0 | 1 | 0 | 0 | 0 | 1 | 0 | 0 | 1 |

FIG. 12

| | | | | | | | | | | | | | | | | | | |
|---|---|---|---|---|---|---|---|---|---|---|---|---|---|---|---|---|---|---|
| 39 | 1 | 0 | 0 | 3 | 4 | 1 | 1 | 1 | 1 | 0 | 0 | 1 | 0 | 1 | 0 | 1 | 0 | 0 | 1 |
| 40 | 1 | 0 | 1 | 0 | 2 | 1 | 0 | 1 | 0 | 0 | 0 | 0 | 0 | 0 | 0 | 1 | 0 | 1 | 0 |
| 41 | 1 | 0 | 1 | 1 | 3 | 1 | 0 | 1 | 1 | 0 | 0 | 0 | 0 | 0 | 0 | 1 | 0 | 1 | 1 |
| 42 | 1 | 0 | 1 | 2 | 4 | 1 | 1 | 1 | 1 | 0 | 0 | 0 | 0 | 1 | 0 | 1 | 0 | 1 | 1 |
| 43 | 1 | 0 | 2 | 0 | 3 | 1 | 1 | 1 | 0 | 0 | 1 | 0 | 0 | 0 | 0 | 1 | 0 | 1 | 0 |
| 44 | 1 | 0 | 2 | 1 | 4 | 1 | 1 | 1 | 1 | 0 | 1 | 0 | 0 | 0 | 0 | 1 | 0 | 1 | 1 |
| 45 | 1 | 0 | 3 | 0 | 4 | 1 | 1 | 1 | 1 | 0 | 1 | 1 | 0 | 0 | 0 | 1 | 0 | 1 | 0 |
| 46 | 1 | 1 | 0 | 0 | 2 | 1 | 1 | 0 | 0 | 0 | 0 | 0 | 0 | 0 | 0 | 1 | 1 | 0 | 0 |
| 47 | 1 | 1 | 0 | 1 | 3 | 1 | 1 | 0 | 1 | 0 | 0 | 0 | 0 | 0 | 0 | 1 | 1 | 0 | 1 |
| 48 | 1 | 1 | 0 | 2 | 4 | 1 | 1 | 1 | 1 | 0 | 0 | 1 | 0 | 0 | 0 | 1 | 1 | 0 | 1 |
| 49 | 1 | 1 | 1 | 0 | 3 | 1 | 1 | 1 | 0 | 0 | 0 | 0 | 0 | 0 | 0 | 1 | 1 | 1 | 0 |
| 50 | 1 | 1 | 1 | 1 | 4 | 1 | 1 | 1 | 1 | 0 | 0 | 0 | 0 | 0 | 0 | 1 | 1 | 1 | 1 |
| 51 | 1 | 1 | 2 | 0 | 4 | 1 | 1 | 1 | 1 | 0 | 0 | 1 | 0 | 0 | 0 | 1 | 1 | 1 | 0 |
| 52 | 1 | 2 | 0 | 0 | 3 | 1 | 1 | 1 | 0 | 0 | 1 | 0 | 0 | 0 | 0 | 1 | 1 | 0 | 0 |
| 53 | 1 | 2 | 0 | 1 | 4 | 1 | 1 | 1 | 1 | 0 | 1 | 0 | 0 | 0 | 0 | 1 | 1 | 0 | 1 |
| 54 | 1 | 2 | 1 | 0 | 4 | 1 | 1 | 1 | 1 | 0 | 0 | 0 | 1 | 0 | 1 | 1 | 1 | 1 | 0 |
| 55 | 1 | 3 | 0 | 0 | 4 | 1 | 1 | 1 | 1 | 0 | 1 | 0 | 0 | 1 | 0 | 1 | 1 | 0 | 0 |
| 56 | 2 | 0 | 0 | 0 | 2 | 1 | 0 | 1 | 0 | 0 | 0 | 0 | 1 | 0 | 0 | 1 | 0 | 0 | 0 |
| 57 | 2 | 0 | 0 | 1 | 3 | 1 | 1 | 0 | 1 | 1 | 0 | 0 | 0 | 0 | 0 | 1 | 0 | 0 | 1 |
| 58 | 2 | 0 | 0 | 2 | 4 | 1 | 1 | 1 | 1 | 1 | 0 | 1 | 0 | 0 | 0 | 1 | 0 | 0 | 1 |
| 59 | 2 | 0 | 1 | 0 | 3 | 1 | 1 | 1 | 0 | 1 | 0 | 0 | 0 | 0 | 0 | 1 | 0 | 1 | 0 |
| 60 | 2 | 0 | 1 | 1 | 4 | 1 | 1 | 1 | 1 | 0 | 0 | 0 | 0 | 0 | 0 | 1 | 0 | 1 | 1 |
| 61 | 2 | 0 | 2 | 0 | 4 | 1 | 1 | 1 | 1 | 1 | 0 | 1 | 0 | 0 | 0 | 1 | 0 | 1 | 0 |
| 62 | 2 | 1 | 0 | 0 | 3 | 1 | 1 | 1 | 0 | 0 | 0 | 0 | 1 | 0 | 0 | 1 | 1 | 0 | 0 |
| 63 | 2 | 1 | 0 | 1 | 4 | 1 | 1 | 1 | 1 | 0 | 0 | 0 | 1 | 0 | 0 | 1 | 1 | 0 | 1 |
| 64 | 2 | 1 | 1 | 0 | 4 | 1 | 1 | 1 | 1 | 0 | 0 | 0 | 0 | 1 | 1 | 1 | 1 | 1 | 0 |
| 65 | 2 | 2 | 0 | 0 | 4 | 1 | 1 | 1 | 1 | 0 | 0 | 1 | 1 | 0 | 1 | 1 | 1 | 0 | 0 |
| 66 | 3 | 0 | 0 | 0 | 3 | 1 | 1 | 1 | 0 | 1 | 0 | 0 | 1 | 0 | 0 | 1 | 0 | 0 | 0 |
| 67 | 3 | 0 | 0 | 1 | 4 | 1 | 1 | 1 | 1 | 1 | 0 | 0 | 1 | 0 | 0 | 1 | 0 | 0 | 1 |
| 68 | 3 | 0 | 1 | 0 | 4 | 1 | 1 | 1 | 1 | 1 | 0 | 0 | 0 | 0 | 1 | 1 | 0 | 1 | 0 |
| 69 | 3 | 1 | 0 | 0 | 4 | 1 | 1 | 1 | 1 | 0 | 0 | 0 | 1 | 0 | 1 | 1 | 1 | 0 | 0 |
| 70 | 4 | 0 | 0 | 0 | 4 | 1 | 1 | 1 | 1 | 1 | 0 | 0 | 1 | 0 | 1 | 1 | 0 | 0 | 0 |

FIG. 13

SEMI-MATRIX UNIT AND CHARGING PILE SCHEDULING SYSTEM INCLUDING THE SAME, AND CHARGING PILE SCHEDULING METHOD

CROSS-REFERENCE TO RELATED APPLICATIONS

This application claims priority to Chinese Patent Application No. 202411631063.7, filed on Dec. 17, 2024, which is hereby incorporated by reference in its entirety.

TECHNICAL FIELD

The present application relates to the technical field related to electric vehicle charging scheduling, and in particular, to a semi-matrix unit and a charging pile scheduling system including the same, and a charging pile scheduling method.

BACKGROUND

The popularity of electric vehicles has led to a rapid increase in demand for charging facilities. As crucial charging facilities, charging piles require optimal scheduling and power allocation to maximize charging efficiency and meet user demands. However, the power allocation and scheduling of charging piles face multiple constraints, including the number of available charging piles and power limitations. Current charging pile systems rely on excessive switching devices, resulting in poor expansibility and overly complex scheduling mechanisms.

To meet these demands, a charging pile scheduling system with a simple scheduling algorithm is required, which can easily expand components in the system, that is, expand charging units, use as few switching devices as possible, and reduce the configuration complexity of the switching devices.

SUMMARY

In view of the foregoing defects, the present application provides a semi-matrix unit and a charging pile scheduling system including the same, and a charging pile scheduling method, which can reduce the use of switching devices, and have strong expansibility and a simple scheduling mechanism.

To achieve the objective of the present application, the following technologies are adopted.

A semi-matrix unit includes:
- a charging modules sequentially arranged, wherein a≥2;
- a charging nodes sequentially arranged, wherein an $i^{th}$ charging module is directly connected to an $i^{th}$ charging node via a cable, 1≤i≤a, and when a charging node is connected to a connector end of a charging connector, a load switch is arranged between the charging node and the connector end;
- a*(a-1)/2 scheduling switches, wherein each scheduling switch is arranged between the $i^{th}$ charging module and a $j^{th}$ charging node, 1≤i≤a, 1≤j≤a, and i≠j; and
- n expansion node groups, wherein each expansion node group includes a expansion nodes sequentially arranged, and an $i^{th}$ expansion node is also connected to the $i^{th}$ charging node by an expansion switch, 1≤i≤a.

A charging pile scheduling system includes b semi-matrix units, wherein in the system, the value a of all the semi-matrix units are the same;

charging nodes of some or all of the semi-matrix units are connected to a connector end by a load switch, a semi-matrix unit in which a charging node is connected to a connector end by a load switch serves as a charging semi-matrix unit, charging nodes of some semi-matrix units are not connected to a connector end, and a semi-matrix unit in which a charging node is not connected to a connector end serves as a power supplement semi-matrix unit, and the charging pile scheduling system includes at least one charging semi-matrix unit; and each of the semi-matrix units is connected to at least one semi-matrix unit, any two connected semi-matrix units are connected via an expansion node group, each pair of expansion nodes with the same serial number of two connected expansion node groups of the connected semi-matrix units are connected in pairs, and only one expansion switch is arranged between the two connected expansion nodes.

Further, in the charging pile scheduling system, a connection structure of the semi-matrix units includes a branching structure, a ring structure, or a network structure.

Further, when a connection structure of the semi-matrix units in the charging pile scheduling system adopts a branching structure:

the charging pile scheduling system includes a main line and a plurality of branch lines, wherein each branch line includes a plurality of semi-matrix units sequentially arranged;

a first expansion node group of a first semi-matrix unit of each branch line is connected to the main line via a cable, and for the first expansion node group of the first semi-matrix unit of each branch line, all expansion nodes with the same serial number are connected; and in each branch line with at least two semi-matrix units, an $i^{th}$ charging node of a previous semi-matrix unit in adjacent semi-matrix units is connected to an $i^{th}$ expansion node of a first expansion node group of a next semi-matrix unit, 1≤i≤a.

Further, when a connection structure of the semi-matrix units of the charging pile scheduling system adopts a ring structure, the semi-matrix units are connected in series to form a single closed loop, and between every two adjacent semi-matrix units, an $i^{th}$ charging node of a previous semi-matrix unit is connected to an $i^{th}$ expansion node of a first expansion node group of a next semi-matrix unit, 1≤i≤a.

Further, when n≥2 and at least two semi-matrix units are provided on each branch line, a connection structure of the semi-matrix units is expanded from a branching structure to a network structure by connecting semi-matrix units in the same sequence position on each branch line, and semi-matrix units across different branch lines are connected by an $x^{th}$ expansion node group, 2≤x≤n.

Further, when the total charging power of the system needs to be expanded, a plurality of power supplement semi-matrix units are newly connected between any two semi-matrix units with idle expansion node groups.

A charging pile scheduling method adopts a charging pile scheduling system and includes the following steps:

S100: monitoring all charging semi-matrix units in real time by the charging pile scheduling system, counting and numbering charging semi-matrix units currently connected to connector ends, wherein a total number of the charging semi-matrix units connected to the connector ends is c;

S200: firstly, determining whether a total number of charging modules required by all charging requests received by an entire system is greater than a total number of charging modules in the charging pile scheduling system, if not, executing S300, and if so, feeding back an error message that charging requirements cannot be met and suspending charging;

S300: setting d=1;

S400: sequentially performing charging scheduling on connector ends in a $d^{th}$ charging semi-matrix unit connected to an connector end; and S500: determining whether d=c, if so, finishing the charging scheduling, and if not, setting d=d+1 and returning to the S400.

Further, the S400 includes the following steps:

S410: setting e=1;

S420: determining whether an $e^{th}$ charging node is connected to a connector end, if so, executing S430, and if not, setting e=e+1 and executing the S420 again;

S430: performing charging scheduling on the $e^{th}$ charging node in the semi-matrix unit in the S400, including:

S431: determining whether an $e^{th}$ charging module is idle, if so, turning off all scheduling switches connected to the $e^{th}$ charging module in the semi-matrix unit in the S430, and turning on a load switch between the $e^{th}$ charging node and a connector end corresponding to the $e^{th}$ charging node to charge the $e^{th}$ charging node by the $e^{th}$ charging module and then executing the S432, and if not, directly executing the S432;

S432: determining whether a number of charging modules for charging the $e^{th}$ charging node is the same as a requested number, if so, finishing the S430 and executing the S440, and if not, executing the S433;

S433: setting f=1;

S434: determining whether an $f^{th}$ charging module in the semi-matrix unit excluding the $e^{th}$ charging module is idle, if so, turning on a scheduling switch between the $f^{th}$ charging module and the $e^{th}$ charging node, and if not, turning off a scheduling switch between the $f^{th}$ charging module and the $e^{th}$ charging node;

S435: determining whether a number of charging modules for charging the $e^{th}$ charging node is the same as a requested number, if so, finishing the S430 and executing the S440, if not, executing the S436;

S436: determining whether f=a−1, if so, executing S437, and if not, setting f=f+1 and returning to the S434;

S437: sequentially borrowing charging modules from semi-matrix units except the semi-matrix unit where the $e^{th}$ charging node is positioned in the system for charging until the number of charging modules for charging the $e^{th}$ charging node reaches the required number; and S440: determining whether e=a, if so, executing the S500, and if not, setting e=e+1 and returning to the S420.

The beneficial effects of this technical solution are as follows.

1. In the semi-matrix unit, a very small number of switching devices are used, and when any one charging module is scheduled to any one charging node, each scheduling switch in the semi-matrix unit only bears the output current of one charging module when being turned on, so that there is no need to configure scheduling switches of different models.

2. The modular structure of the charging pile scheduling system may enable the semi-matrix units to be connected in a branching structure, a ring structure and a network structure, may support the semi-matrix units in the system to serve as charging semi-matrix units or power supplement semi-matrix units, and may conveniently expand the number of charging connections and the charging power.

3. The implementation of the charging pile scheduling method is relatively simple, and charging scheduling may be easily achieved.

BRIEF DESCRIPTION OF DRAWINGS

FIG. 12 is a scheduling table according to an embodiment of the present application.

FIG. 13 is a continuation of the scheduling table shown in FIG. 12 according to an embodiment of the present application.

DESCRIPTION OF EMBODIMENTS

The present application is further described below with reference to the accompanying drawings and embodiments.

Figure 1:
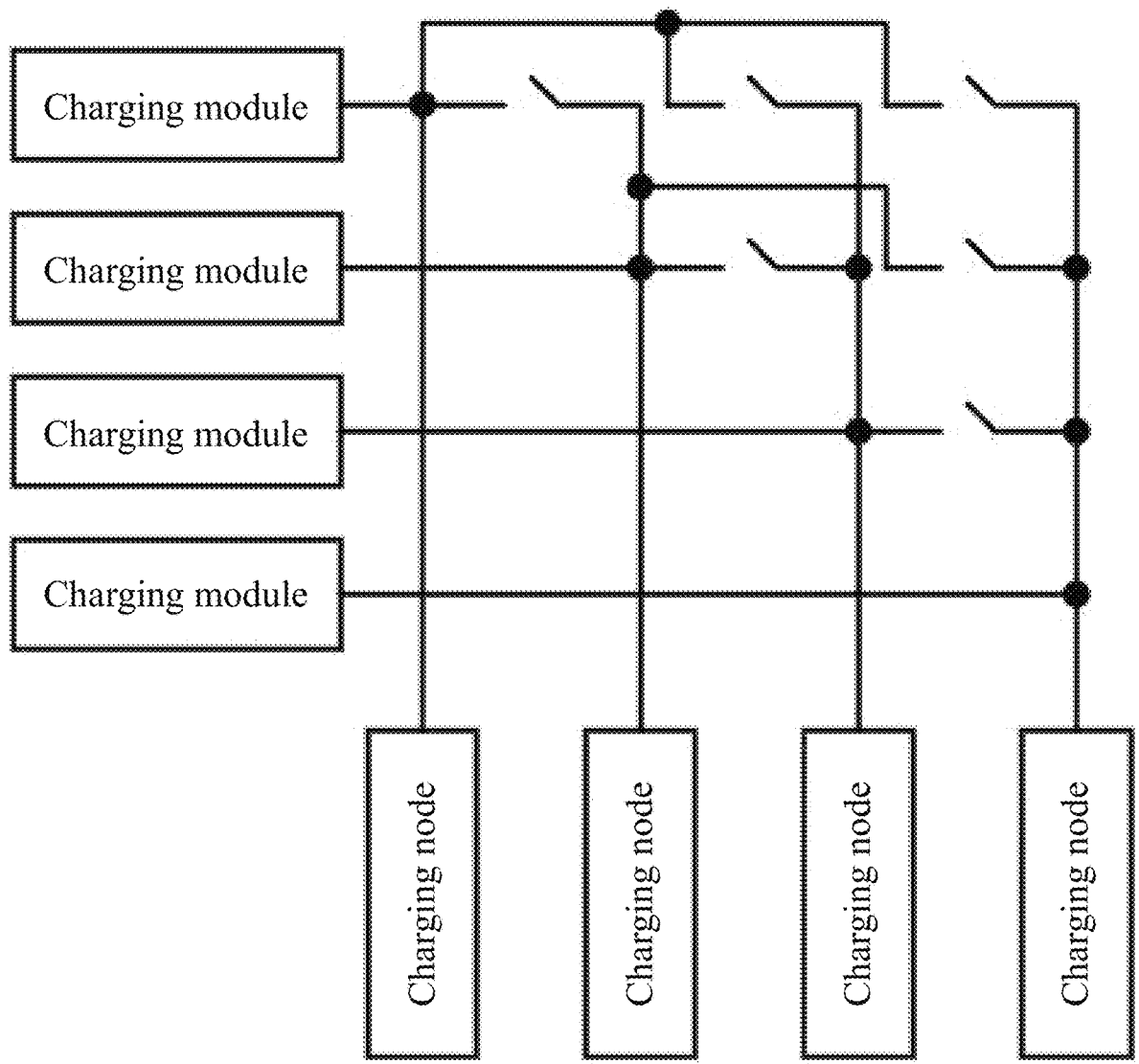
FIG. 1 is a schematic circuit diagram of a charging module, a charging node and a scheduling switch in a semi-matrix unit according to an embodiment of the present application.

A semi-matrix unit shown in FIG. 1 includes a charging modules and a charging nodes, a≥2.

The a charging modules are sequentially arranged, the a charging nodes are also sequentially arranged, and an $i^{th}$ charging module is directly connected to an $i^{th}$ charging node via a cable, 1≤i≤a.

Each of $a*(a-1)/2$ scheduling switches is arranged between the $i^{th}$ charging module and a $j^{th}$ charging node, $1 \leq i \leq a$, $1 \leq j \leq a$, and $i \neq j$.

Such a structure and scheduling switch configuration can reduce the number of scheduling switches required. Taking a 4×4 matrix as an example, a traditional full-matrix solution requires 16 switch groups, while the semi-matrix solution in the present application only requires 6 switch groups.

Figure 2:
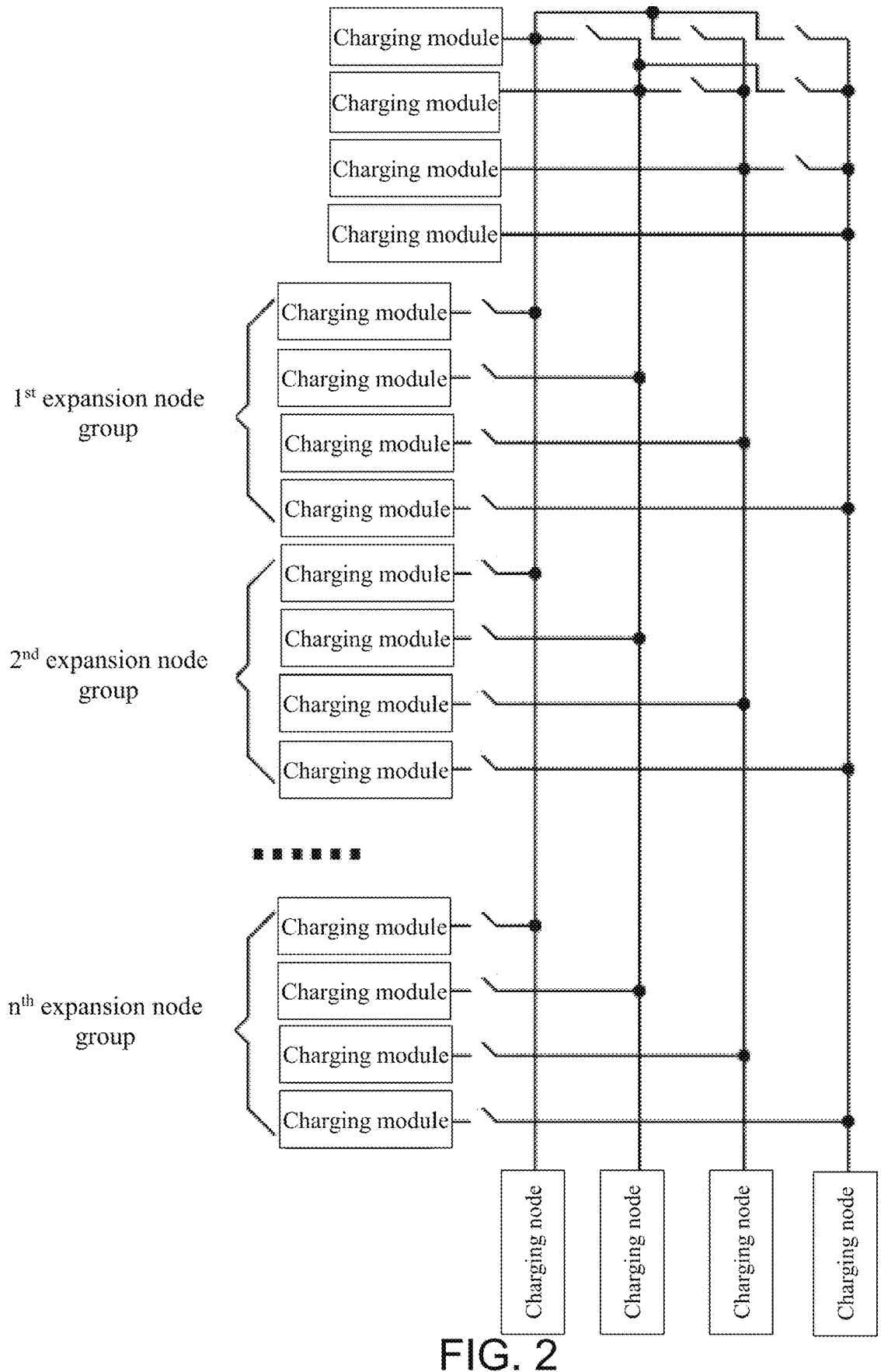
FIG. 2 is a schematic diagram of a semi-matrix unit circuit with an expansion node group added to FIG. 1 according to an embodiment of the present application.

As shown in FIG. 2, to stack and expand semi-matrix units, the semi-matrix unit further includes n expansion node groups, each expansion node group includes a expansion nodes sequentially arranged, an $i^{th}$ expansion node is also connected to the $i^{th}$ charging node by an expansion switch, $1 \leq i \leq a$.

In this embodiment, as shown in FIG. 1 and FIG. 2, a=4, that is, 4 charging modules and 4 charging nodes are provided, and 6 scheduling switches are provided.

Figure 3:
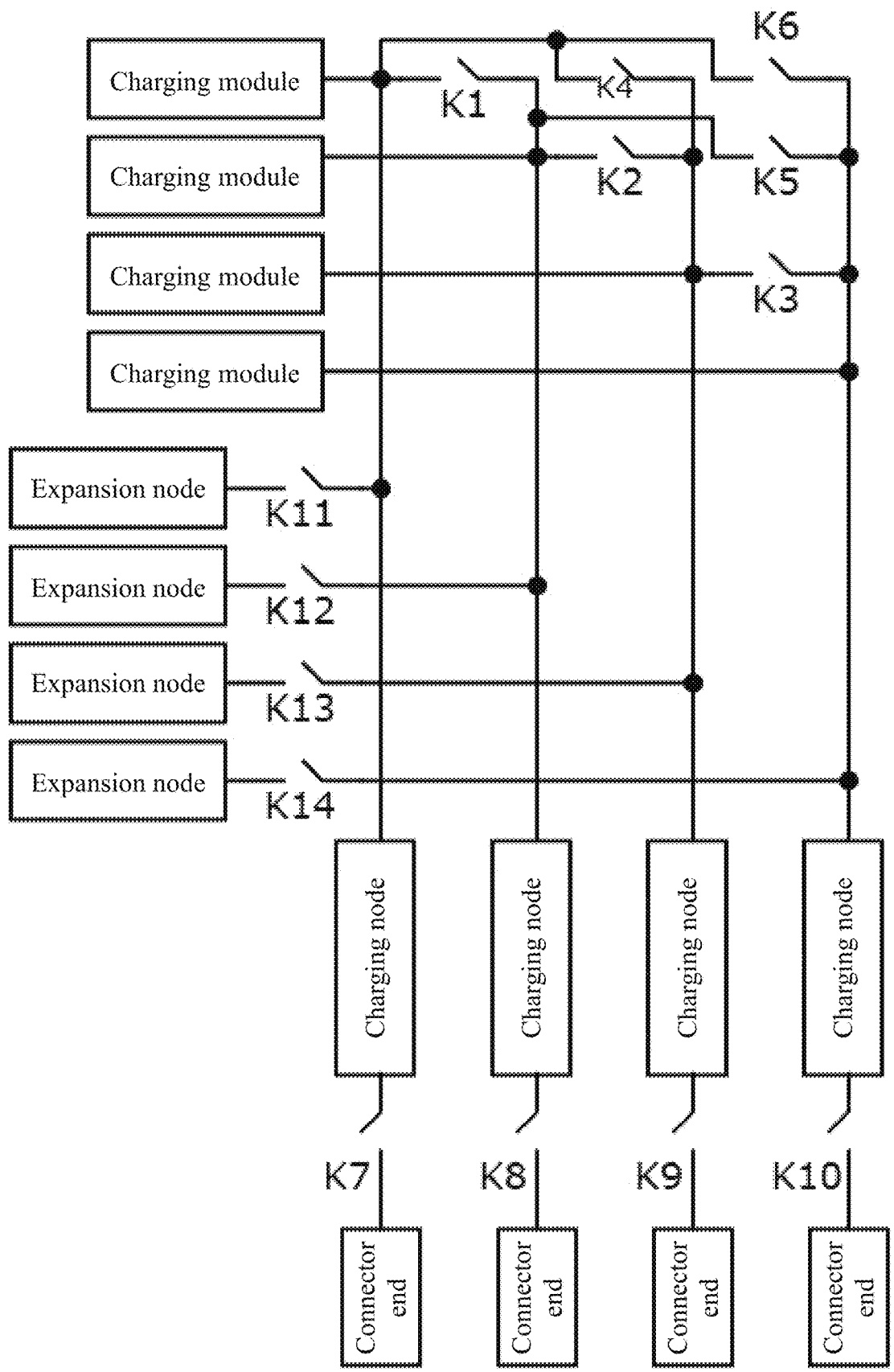
FIG. 3 is a schematic diagram of a semi-matrix unit circuit connected to a plurality of connector ends according to an embodiment of the present application.

As shown in FIG. 3, when a charging node is connected to a connector end of a charging connector, a load switch is arranged between the charging node and the connector end. If n=1, K1-K6 are scheduling switches, K7-K10 are load switches, and K11-K14 are expansion switches in FIG. 3.

FIGS. 4 to 8 show a charging pile scheduling system, which includes b semi-matrix units.

In the charging pile scheduling system, the value a of all the semi-matrix units is the same, and preferably, the value n of all the semi-matrix units is also the same;

charging nodes of some or all of the semi-matrix units are connected to a connector end by a load switch, a semi-matrix unit in which a charging node is connected to a connector end by a load switch serves as a charging semi-matrix unit, charging nodes of some semi-matrix units are not connected to a connector end, and a semi-matrix unit in which a charging node is not connected to a connector end serves as a power supplement semi-matrix unit, and the charging pile scheduling system includes at least one charging semi-matrix unit; and each of the semi-matrix units is connected to at least one semi-matrix unit, any two connected semi-matrix units are connected via an expansion node group, each pair of expansion nodes with the same serial number of two connected expansion node groups of the connected semi-matrix units are connected in pairs, and only one expansion switch is arranged between the two connected expansion nodes.

In the charging pile scheduling system, a connection structure of the semi-matrix units includes a branching structure, a ring structure, or a network structure.

The following are some examples of specific forms of the charging pile scheduling system.

Figure 4:
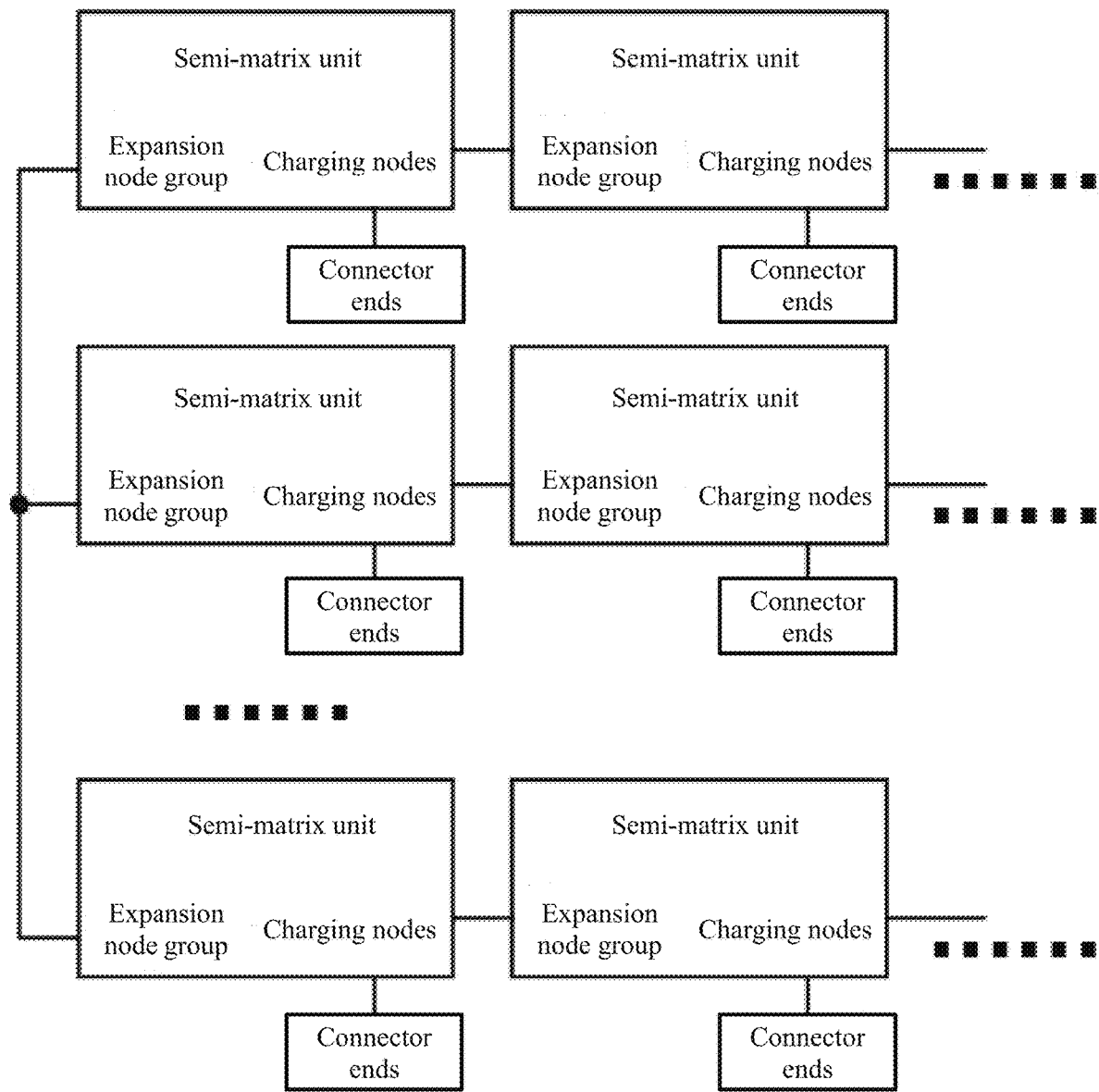
FIG. 4 is a schematic circuit diagram of a charging pile scheduling system in which semi-matrix units are connected in a branching structure according to an embodiment of the present application.

First, as shown in FIG. 4, in each example, each semi-matrix unit is provided with an expansion node group, and when the connection structure of the semi-matrix units in the charging pile scheduling system adopts a branching structure:

the charging pile scheduling system includes a main line and a plurality of branch lines, wherein each branch line includes a plurality of semi-matrix units sequentially arranged.

A first expansion node group of a first semi-matrix unit of each branch line is connected to the main line via a cable.

Further, it is not specifically shown in FIG. 4 but may be easily known in combination with the semi-matrix unit circuit that, all expansion nodes with the same sequence number are connected for the first expansion node group of the first semi-matrix unit of each branch line.

Each expansion node is directly connected to the corresponding charging node with the same serial number inside the semi-matrix unit. That is, in each branch line with at least two semi-matrix units, an $i^{th}$ charging node of a previous semi-matrix unit in adjacent semi-matrix units is connected to an $i^{th}$ expansion node of a first expansion node group of a next semi-matrix unit, $1 \leq i \leq a$.

If the adopted semi-matrix unit is provided with more than one expansion node group, the first expansion node group may be connected in the above manner, and the other expansion node groups are reserved for subsequent expansion.

Figure 5:
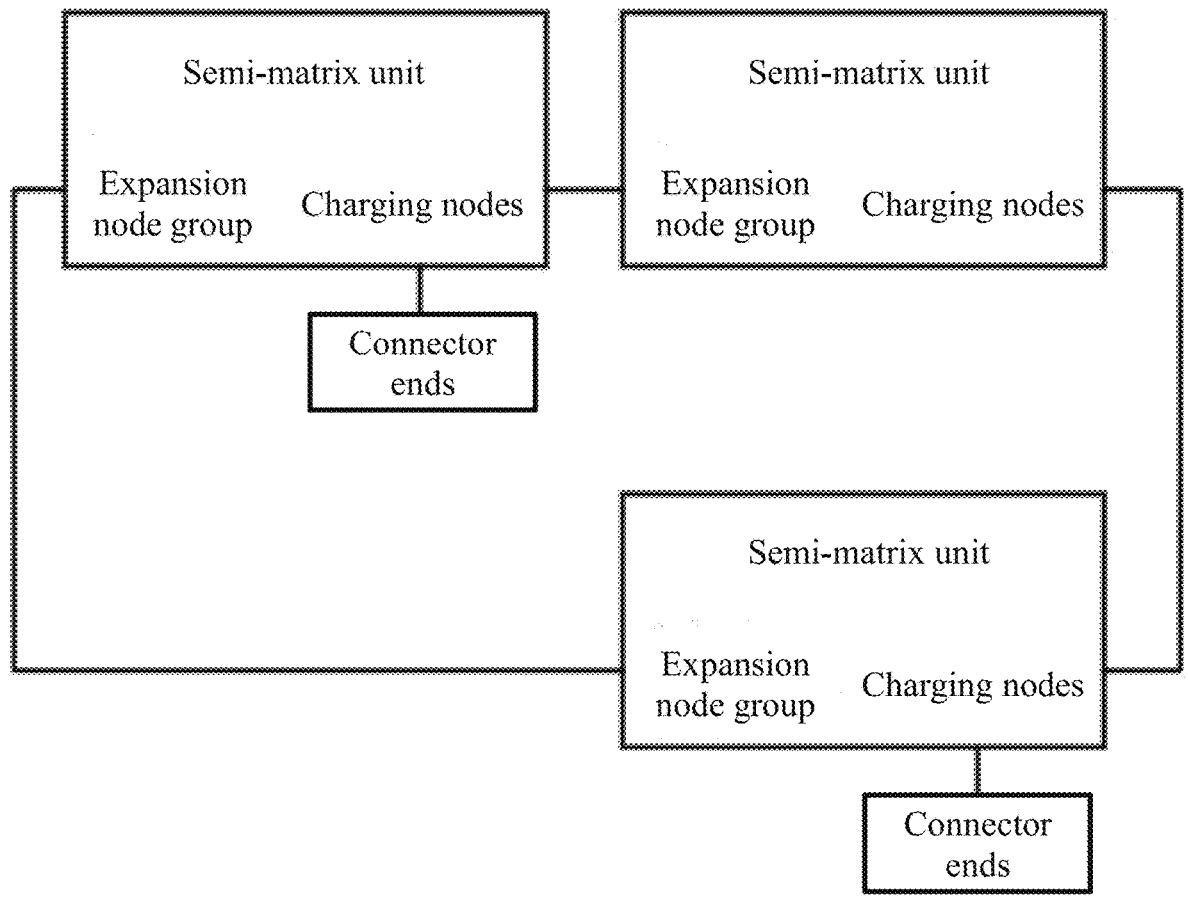
FIG. 5 is a schematic circuit diagram of a charging pile scheduling system in which semi-matrix units are connected in a ring structure according to an embodiment of the present application.

Secondly, as shown in FIG. 5, when the connection structure of the semi-matrix units of the charging pile scheduling system adopts a ring structure, the semi-matrix units are connected in series to form a single closed loop. The example in FIG. 5 shows that fewer semi-matrix units are used, for example, 3. If more semi-matrix units are to be used, the semi-matrix units are connected in series to form a single closed loop. Each semi-matrix unit is connected to a connector end or reserved according to specific situations, for example, 2 semi-matrix units are connected to a connector end in FIG. 5.

Figure 6:
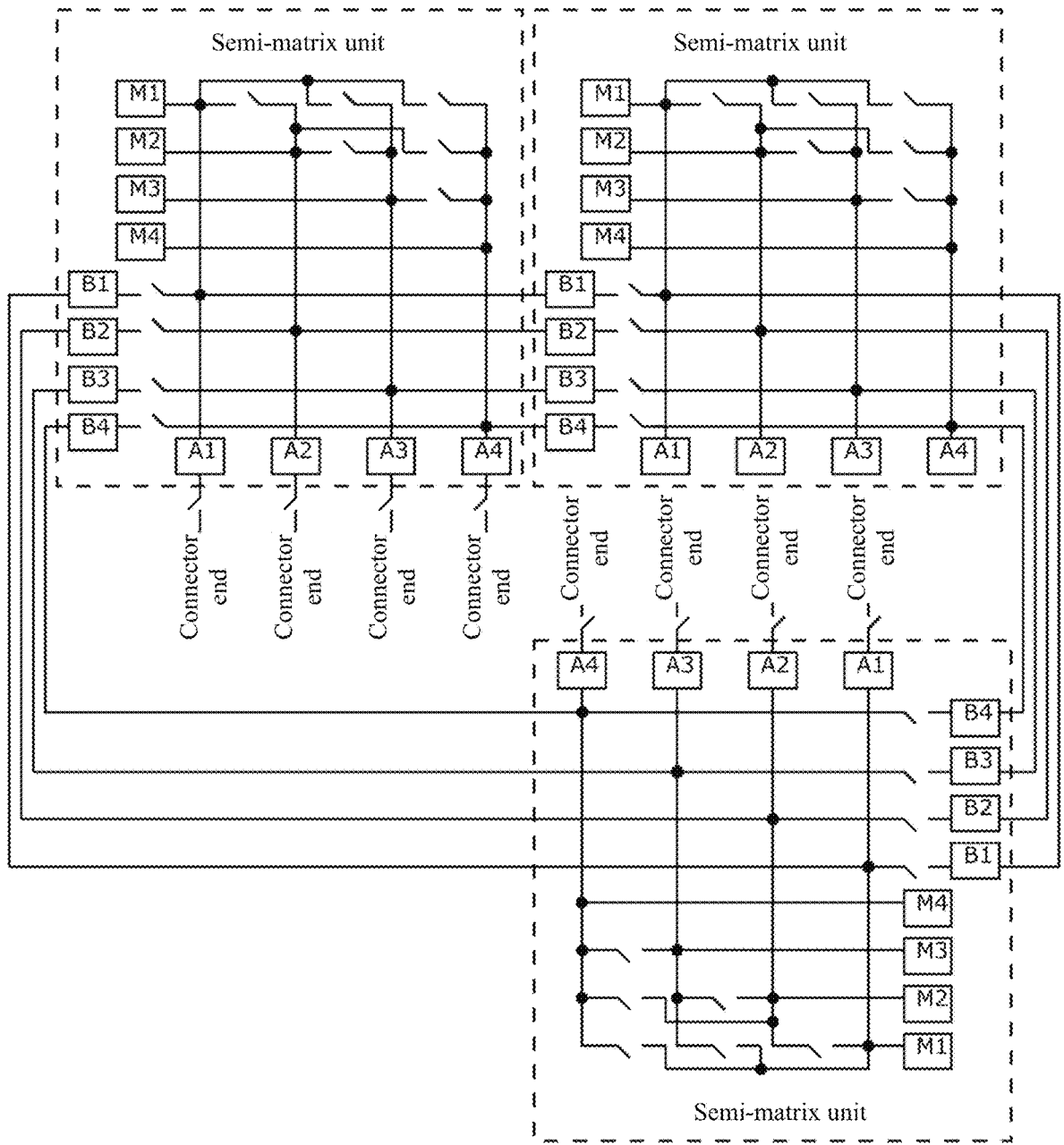
FIG. 6 is a schematic circuit diagram showing FIG. 5 in detail according to an embodiment of the present application.

FIG. 6 shows more clearly the specific connection mode using the configuration in FIG. 5 as an example. Between every two adjacent semi-matrix units, an $i^{th}$ charging node of a previous semi-matrix unit is connected to an $i^{th}$ expansion node of a first expansion node group of a next semi-matrix unit, $1 \leq i \leq a$.

Figure 7:
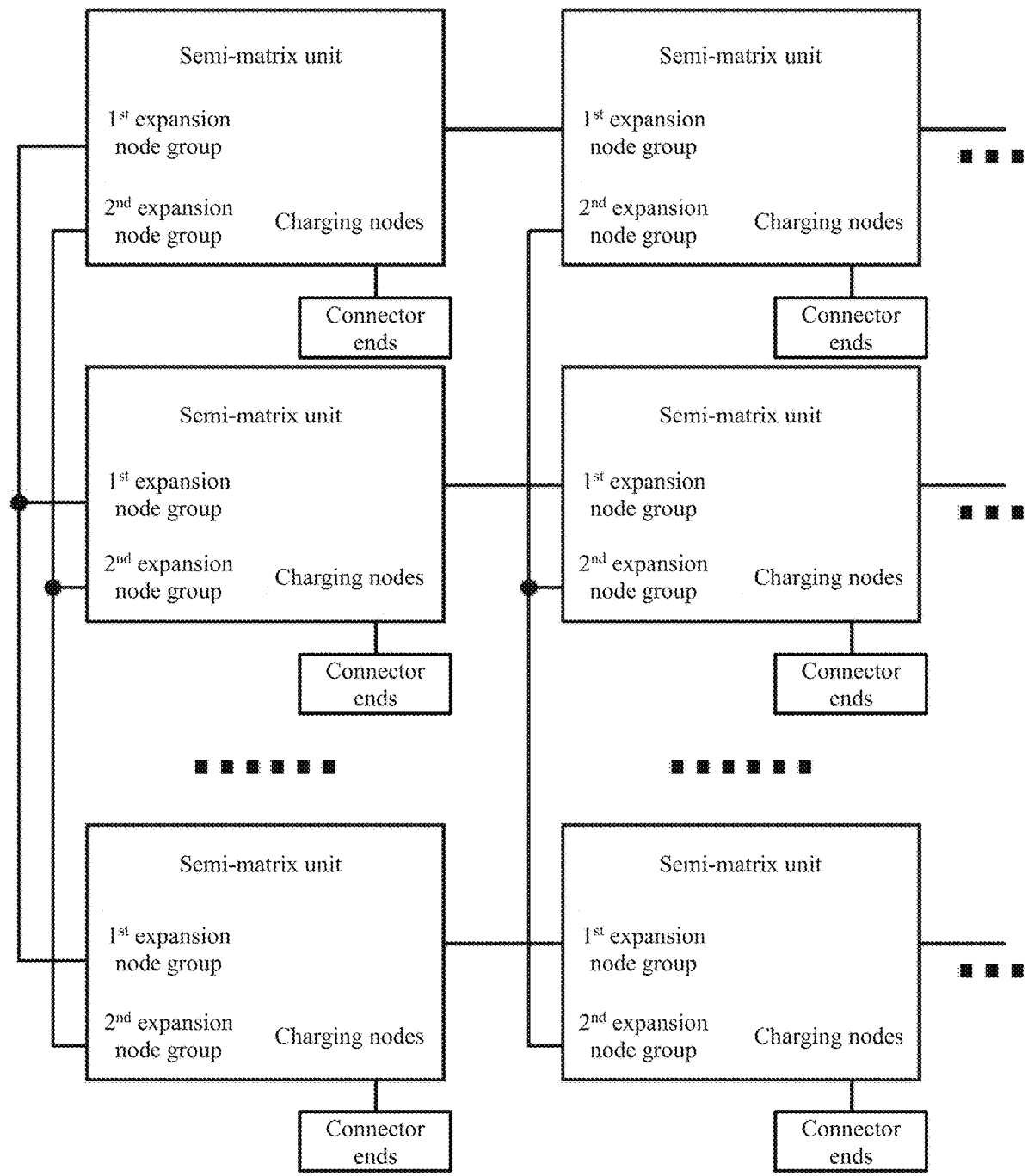
FIG. 7 is a schematic circuit diagram of a charging pile scheduling system in which semi-matrix units are connected in a network structure according to an embodiment of the present application.

Thirdly, as shown in FIG. 7, on the basis of FIG. 4, the adopted semi-matrix units are all provided with two expansion node groups instead of one. The cross-branch connection is performed by the second expansion node group. This example is extended to a general case, specifically, when $n \geq 2$ and at least two semi-matrix units are provided on each branch line, a connection structure of the semi-matrix units is expanded from a branching structure to a network structure by connecting semi-matrix units in the same sequence position on each branch line, and semi-matrix units across different branch lines are connected by an $x^{th}$ expansion node group, $2 \leq x \leq n$.

Figure 8:
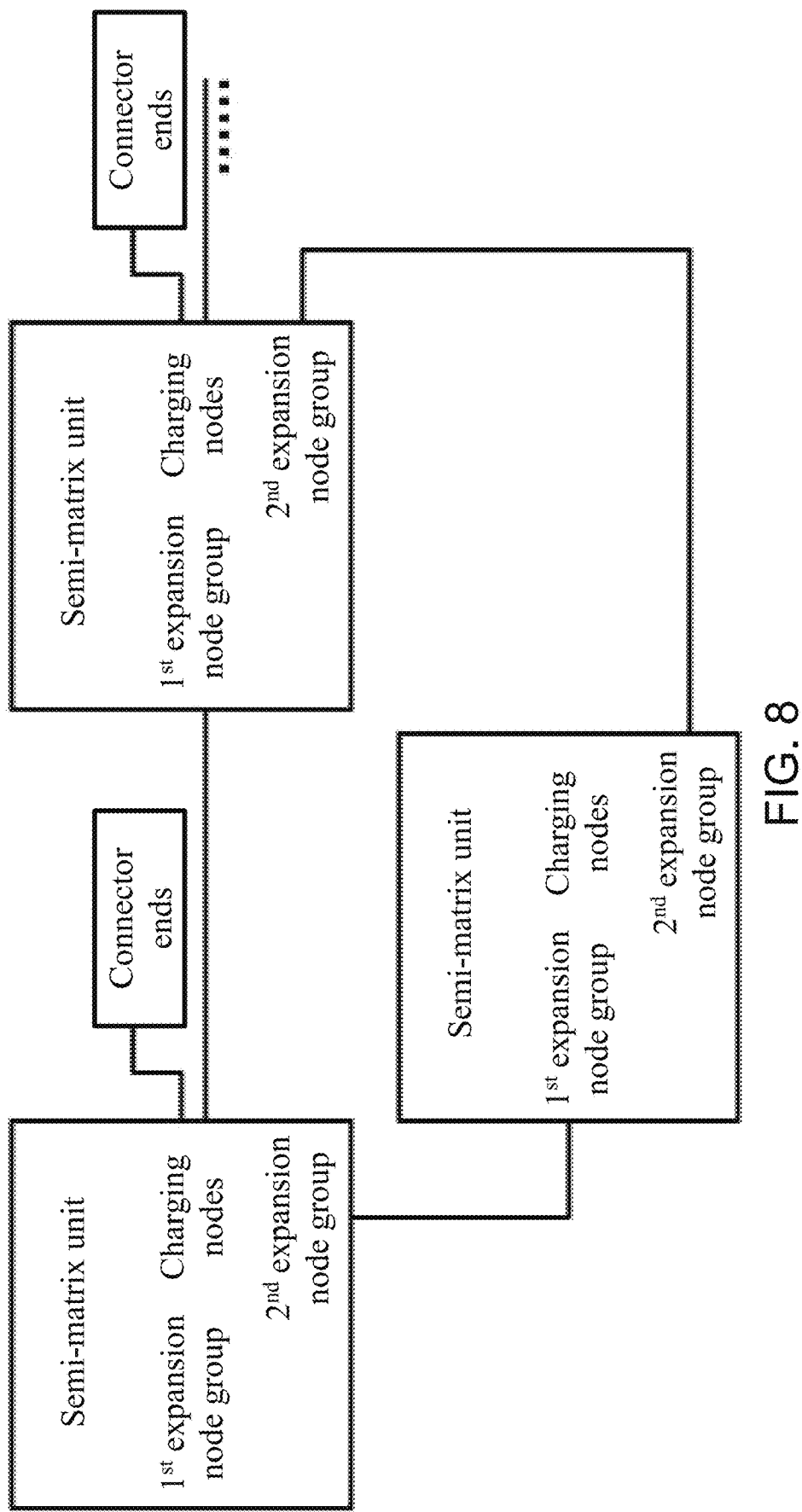
FIG. 8 is a partial schematic circuit diagram according to an embodiment of the present application when the total charging power of a charging pile scheduling system is expanded.

Fourthly, as shown in FIG. 8, a section of a branch line of a branching structure is selected for illustration. The same is true for a ring structure or a network structure. The adopted semi-matrix units are all provided with two expansion node groups. When the total charging power of the system needs to be expanded, a plurality of power supplement semi-matrix units are newly connected between any two semi-matrix units with idle expansion node groups.

It may be seen from FIG. 8 that, the two upper semi-matrix units are connected to a connector end, while the lower semi-matrix unit serves as a power supplement semi-matrix unit and is not connected to the connector end.

If the adopted semi-matrix units are all provided with three expansion node groups, when a plurality of power supplement semi-matrix units are added, cross-branch connections similar to those in FIG. 7 may also be made by a third expansion node group.

Figure 9:
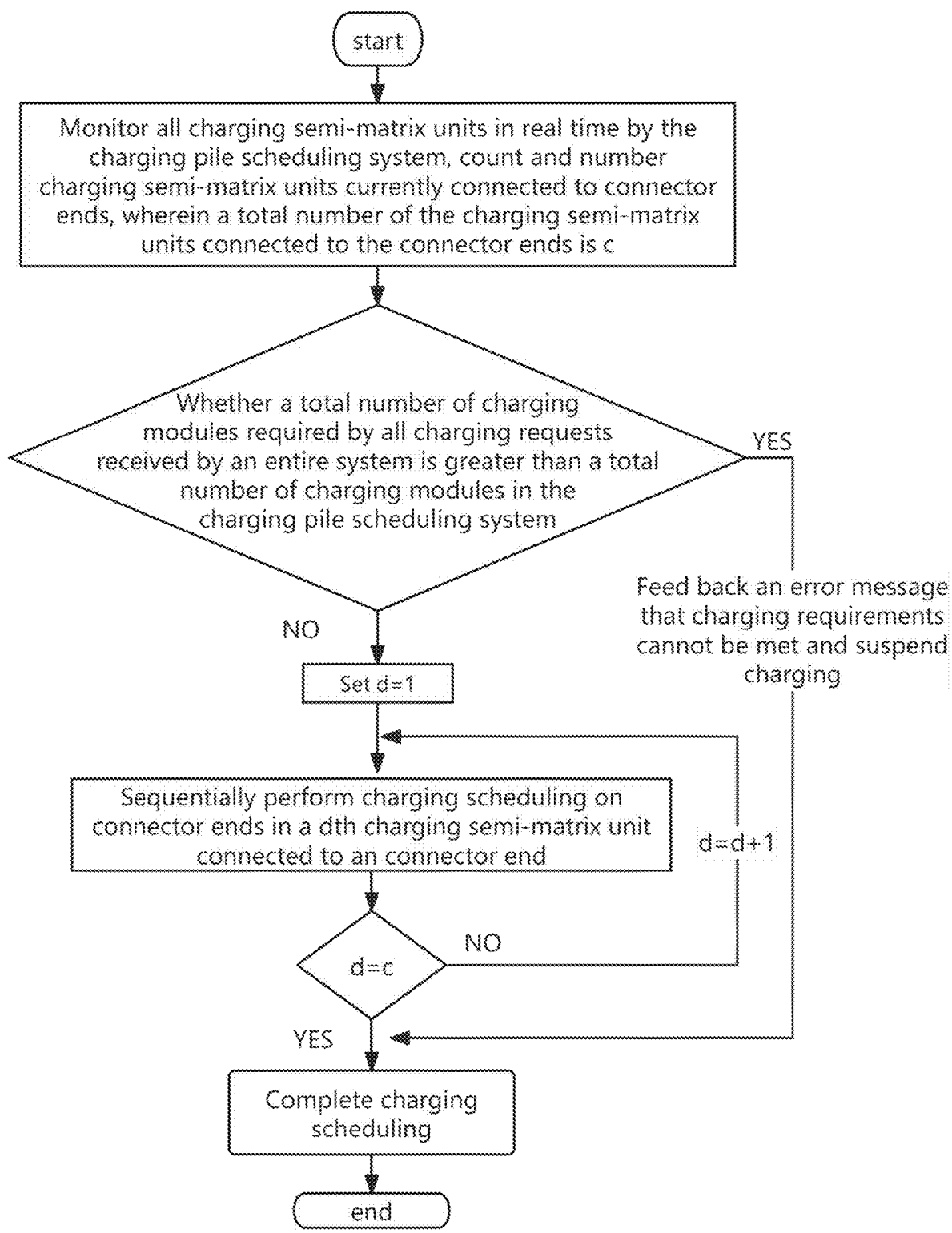
FIG. 9 is a main flowchart of a charging pile scheduling method according to an embodiment of the present application.
Figure 10:
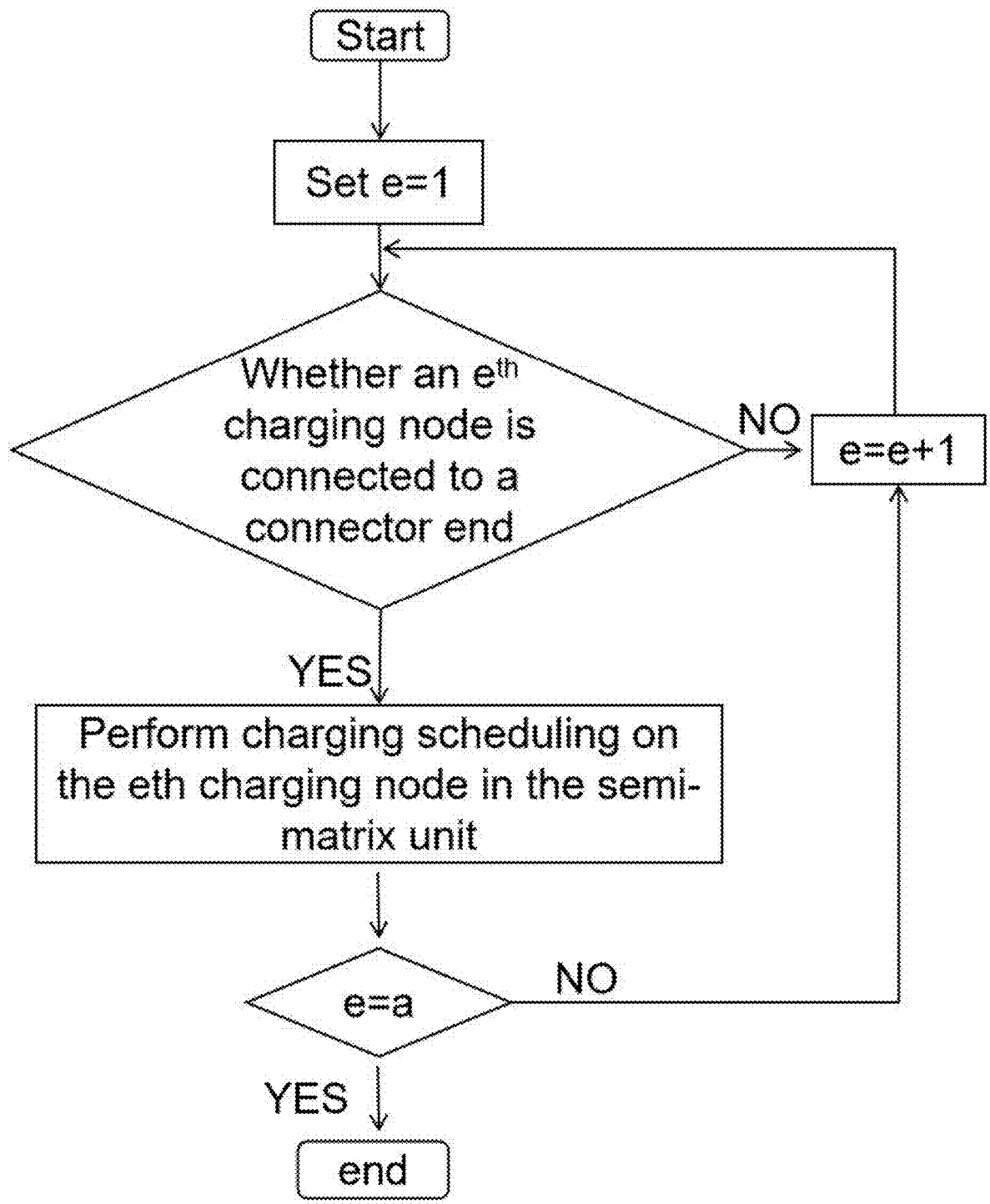
FIG. 10 is a main flowchart of step S400 in a charging pile scheduling method according to an embodiment of the present application.
Figure 11:
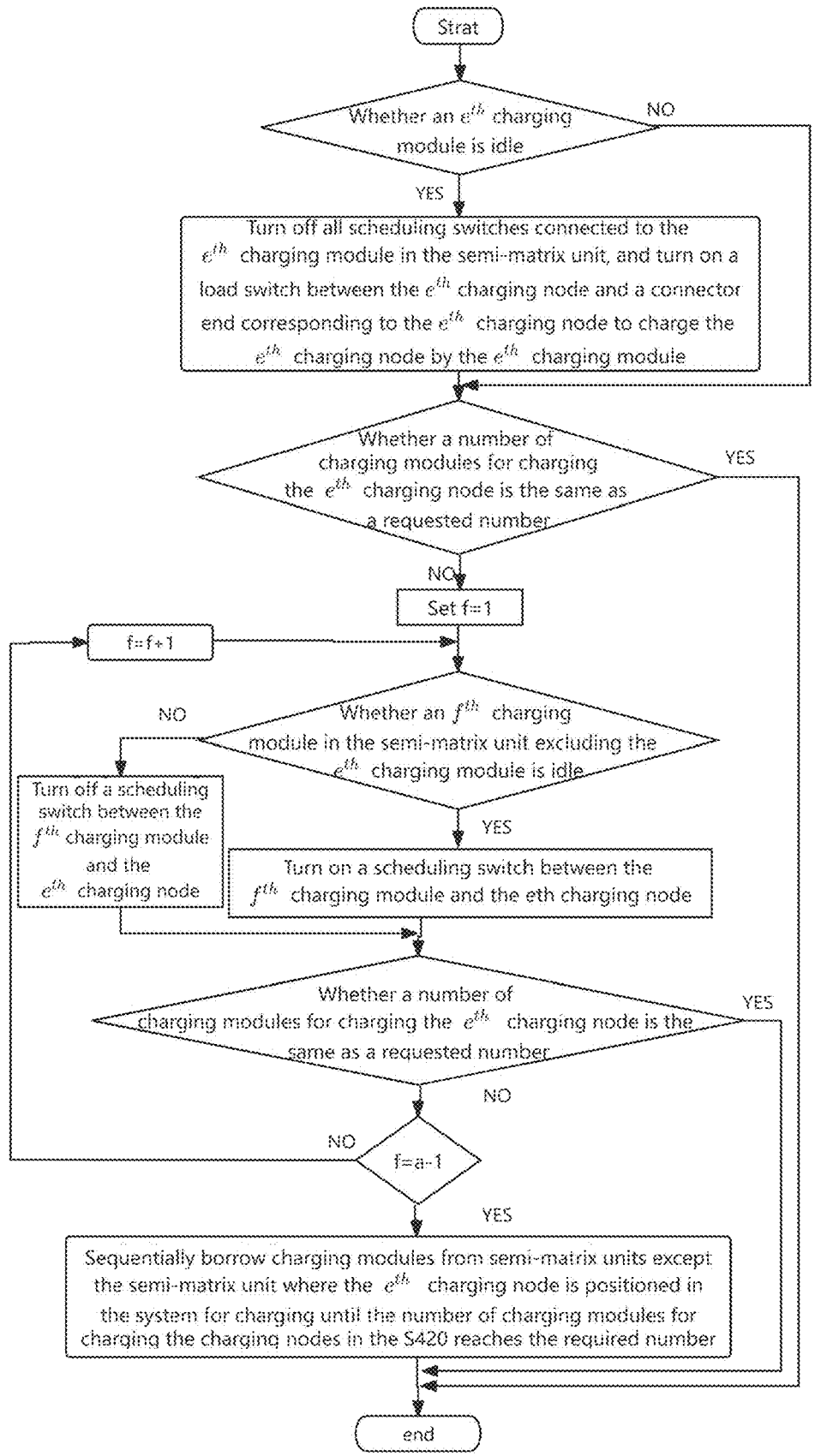
FIG. 11 is a main flowchart of step S430 in a charging pile scheduling method according to an embodiment of the present application.

As shown in FIG. 9, a charging pile scheduling method adopts the charging pile scheduling system. Preferably, to be able to execute the scheduling method, the scheduling system further includes a controller and a display module, the controller is configured to execute the scheduling method, the display module is configured to display the system states and provide error prompts, and the scheduling method is performed according to the following steps:

S100: monitoring all charging semi-matrix units in real time by the charging pile scheduling system, counting and numbering charging semi-matrix units currently connected to connector ends, wherein a total number of the charging semi-matrix units connected to the connector ends is c;

S200: firstly, determining whether a total number of charging modules required by all charging requests received by an entire system is greater than a total number of charging modules in the charging pile scheduling system, if not, executing S300, and if so, feeding back an error message that charging requirements cannot be met and suspending charging; specifically, feeding back the error message to a user by display module;

S300: setting d=1;

S400: sequentially performing charging scheduling on connector ends in a $d^{th}$ charging semi-matrix unit connected to an connector end, as shown in FIG. 10, including:

S410: setting e=1;

S420: determining whether an $e^{th}$ charging node is connected to a connector end, if so, executing S430, and if not, setting e=e+1 and executing the S420 again;

S430: performing charging scheduling on the $e^{th}$ charging node in the semi-matrix unit in the S400, as shown in FIG. 11, including:

S431: determining whether an $e^{th}$ charging module is idle, if so, turning off all scheduling switches connected to the $e^{th}$ charging module in the semi-matrix unit in the S430, and turning on a load switch between the $e^{th}$ charging node and a connector end corresponding to the $e^{th}$ charging node to charge the $e^{th}$ charging node by the $e^{th}$ charging module and then executing the S432, and if not, directly executing the S432;

S432: determining whether a number of charging modules for charging the $e^{th}$ charging node is the same as a requested number, if so, finishing the S430 and executing the S440, and if not, executing the S433;

S433: setting f=1;

S434: determining whether an $f^{th}$ charging module in the semi-matrix unit excluding the $e^{th}$ charging module is idle, if so, turning on a scheduling switch between the $f^{th}$ charging module and the $e^{th}$ charging node, and if not, turning off a scheduling switch between the $f^{th}$ charging module and the $e^{th}$ charging node;

S435: determining whether a number of charging modules for charging the $e^{th}$ charging node is the same as a requested number, if so, finishing the S430 and executing the S440, if not, executing the S436;

S436: determining whether f=a−1, if so, executing S437, and if not, setting f=f+1 and returning to the S434;

S437: sequentially borrowing charging modules from semi-matrix units except the semi-matrix unit where the $e^{th}$ charging node is positioned in the system for charging until the number of charging modules for charging the $e^{th}$ charging node reaches the required number, including S4371: setting g=1;

S4372: in a $g^{th}$ semi-matrix unit for borrowing charging modules described in the S437, burrowing the charging modules sequentially until the number of charging modules for charging the $e^{th}$ charging node is the same as the requested number or until the borrowing of all charging modules in the semi-matrix unit is completed, and the borrowing of the charging module includes the following steps:

S43721: setting h=1;

S43722: if h=c, turning on all expansion switches within a circuit path range with the least expansion switches between an $h^{th}$ charging module and the $e^{th}$ charging node, if h≠e, turning on the scheduling switches between an $h^{th}$ charging node and the $e^{th}$ expansion node, turning on all expansion switches within a circuit path range with the least expansion switches between the expansion node and the $e^{th}$ charging node, and turning off scheduling switches between the $h^{th}$ charging module and expansion nodes in the semi-matrix unit except the $e^{th}$ expansion node;

S43723: determining whether h=a, if so, executing S4373, and if not, setting h=h+1 and returning to the S43722;

S4373: determining whether g=b−1, if so, finishing the S430 and executing S440, and if not, setting g=g+1 and returning to the S4372;

S440: determining whether e=a, if so, executing S500, and if not, setting e=e+1 and returning to the S420; and S500: determining whether d=c, if so, finishing the charging scheduling, and if not, setting d=d+1 and returning to the S400.

In another embodiment, for a single semi-matrix unit, a scheduling table may be pre-calculated, and when in use, the system directly looks up the table according to a requirement. The specific table is shown in FIG. 12 and FIG. 13.

In the semi-matrix unit, when the charging module is scheduled to the charging node, the last four columns in the table are the switch state scheduling of K7-K10, that is, the load switch is operated.

If the semi-matrix unit is used to supplement power to other semi-matrix units, the last four columns in the table are the switch state scheduling of K11-K14, namely, the expansion switch is operated, so that the table may be further used for scheduling systems with various different connection modes.

The above are only some of the embodiments listed in the present application and are not intended to limit the present application.

What is claimed is:

1. A charging pile scheduling method comprising:
   (a) providing a charging pile scheduling system including a plurality of semi-matrix units, and
   each semi-matrix units comprising:
       (i) four charging modules arranged sequentially;
       (ii) four charging nodes arranged sequentially, wherein each $i^{th}$ charging module, (1<i<4) is directly connected to an $j^{th}$ charging node (1<j<4 and i≠j) via a cable;
       (iii) a charging connector with a connector end;
       (iii) a load switch arranged between the charging nodes and connector end;
       (iv) six scheduling switches disposed between the charging modules and the charging nodes;
   (b) providing a plurality of expansion node groups, wherein each of the expansion node groups wherein each expansion group comprises four expansion nodes arranged sequentially
   and an $i^{th}$ expansion node is connected to the $i^{th}$ charging node by an expansion switch, 1<i<4;
   (c) connecting the charging nodes of at least one of the plurality of semi-matrix units to the connector end via a load switch to form:
       (i) at least one charging semi-matrix unit in which a charger node is connected to the connector end by the load switch;

(ii) at least one of the charging nodes not connected to the connector end to form: a power supplement semi-matrix unit;

(d) connecting the semi-matrix units to the at least one other semi-matrix unit, wherein:
  (i) at least two of the semi-matrix units are connected via at least one of the expansion node groups;
  (ii) wherein each of the expansion node groups comprise a serial number, each of the expansion nodes with the same serial number are connected to each other via an expansion switch arranged between the two expansion nodes;

(e) configuring a connection structure of the semi-matrix units in the charging pile scheduling system, wherein the connection structure is selected from a branching structure, a ring structure, or a network structure;

(f) when a total charging power of the system needs to be expanded, connecting a plurality of power supplement semi-matrix units with idle expansion node groups;

(g) when the connection structure of the semi-matrix units connects in a branching structure:
  (i) configuring the charging pile scheduling system to comprise a main line and a plurality of branch lines;
  (ii) each branch line comprising a plurality of semi-matrix units arranged sequentially;
  (iii) connecting a first expansion node group of a first semi-matrix unit of each branch line to the main line via a cable, and connecting all expansion nodes of the first expansion node group of each branch line that have the same serial number;
  (iv) in each branch line having at least two semi-matrix units, connecting an $i^{th}$ charging node of a previous semi-matrix unit in adjacent semi-matrix units to an $i^{th}$ expansion node of a first expansion node group of another semi-matrix unit ($1<i<4$);

(h) when n≥2 and at least two semi-matrix units are provided on each branch line:
  (i) expanding the connection structure from a branching structure to a network structure by connecting semi-matrix units in the same sequence position across different branch lines; and
  (ii) connecting semi-matrix units across different branch lines by an $x^{th}$ expansion node of a first expansion node group ($2≤x≤n$);

(i) when the connection structure of the semi-matrix unit adopts a ring structure:
  (i) connecting the semi-matrix units in series to form a single closed loop; and
  (ii) connecting an $i^{th}$ charging node of a previous semi-matrix unit to an $i^{th}$ expansion node of a first expansion node group of a next semi-matrix unit ($1<i<4$);

(j) performing a charging pile scheduling method comprising:
  (S100) monitoring all charging semi-matrix units in real time by the charging pile scheduling system, and counting and numbering charging semi-matrix units currently connected to connector ends;
  (S200) determining whether a total number of charging modules required by all charging requests received by the entire system is greater than a total number of charging modules in the charging pile scheduling system;
  (S300) setting a scheduling counter variable d=1;
  (S400) performing charging scheduling on connector ends in a $d^{th}$ charging semi-matrix unit connected to a connector end, comprising:
  (S410) setting a node counter variable e=1;
  (S420) determining whether an $e^{th}$ charging node is connected to a connector end;
  (S430) performing charging scheduling on the $e^{th}$ charging node in the semi-matrix unit, comprising:
    (S431): determining whether an $e^{th}$ charging module is idle;
      if so, turning off all scheduling switches connected to the $e^{th}$ charging module in the semi-matrix unit;
      turning on a load switch between the $e^{th}$ charging node and the corresponding connector end;
      charging the $e^{th}$ node by the $e^{th}$ charging module; and
      executing step (S432);
      if not, directly execute (S432);
    (S432): determining whether the number of charging modules for charging the $e^{th}$ charging node equals a requested number;
      if so, finishing step (S430) and proceeding to step (S440)
      if not, executing step (S433);
    (S433): setting a scheduling index f=1;
    (S434): determining whether an $f^{th}$ charging module in the semi-matrix unit (excluding the $e^{th}$ charging module) is idle;
      if so, turning on a scheduling switch between the $f^{th}$ charging module and the $e^{th}$ charging node;
      if not, turning off the scheduling switch between the $f^{th}$ charging module and the $e^{th}$ charging node;
    (S435) determining whether the number of charging modules for charging the $e^{th}$ charging node equals the requested number;
      if so, finishing step (S430) and proceeding to step (S440);
      if not, executing step (S436);
    (S436) determining whether (f=a−1);
      if so, executing step (S437)
      if not, setting f=f+1 and returning to step (S434);
    (S437) sequentially borrowing charging modules from semi-matrix units, excluding the semi matrix in when the $e^{th}$ charging node is positioned, until the number of charging modules for the $e^{th}$ charging node reaches the requested number or all borrowing is completed comprising:
      (S4371) setting g=1
      (S4372) in a $g^{th}$ semi-matrix unit used for borrowing:
        sequentially borrowing charging modules until the number of charging modules for the $e^{th}$ charging node reaches the requested number or until all available charging modules in the $g^{th}$ semi matrix unit are used, comprising:
        (S43721) setting h=1;
        (S43722) if h=e, turning on all expansion switches within a circuit path range with the fewest expansion switches between an $h^{th}$ charging module and the $e^{th}$ charging node;
        if h≠e:
          turning on scheduling switches between an $h^{th}$ charging node and an $e^{th}$ expansion node;

turning on all expansion switches within a circuit range with the fewest expansion switches between the $h^{th}$ charging module and the $e^{th}$ charging node turning off all scheduling switches between the $h^{th}$ charging module and expansion nodes in the semi-matrix unit excluding the $e^{th}$ expansion node;

(S43723): determining whether h=a;
if so, executing step (S4373);
if not, setting h=h+1 and returning to step (S437222);
(S4373): determining whether g=b=1;
if so, finishing step (S430) and executing step (S440);
if not, setting g=g+1 and returning to step (S4372);
(S440) determining whether e=a;
if so, executing step (S500);
if not, setting e=e+1 and returning to step (S420);
(S500) determining whether d=c;
if so, finishing the charging scheduling;
if not, setting d=d+1 and returning to step (S400).

\* \* \* \* \*